March 2, 1954 — C. E. L. LUCKY — 2,670,951
TOWING GEAR
Filed Oct. 22, 1951 — 2 Sheets-Sheet 1
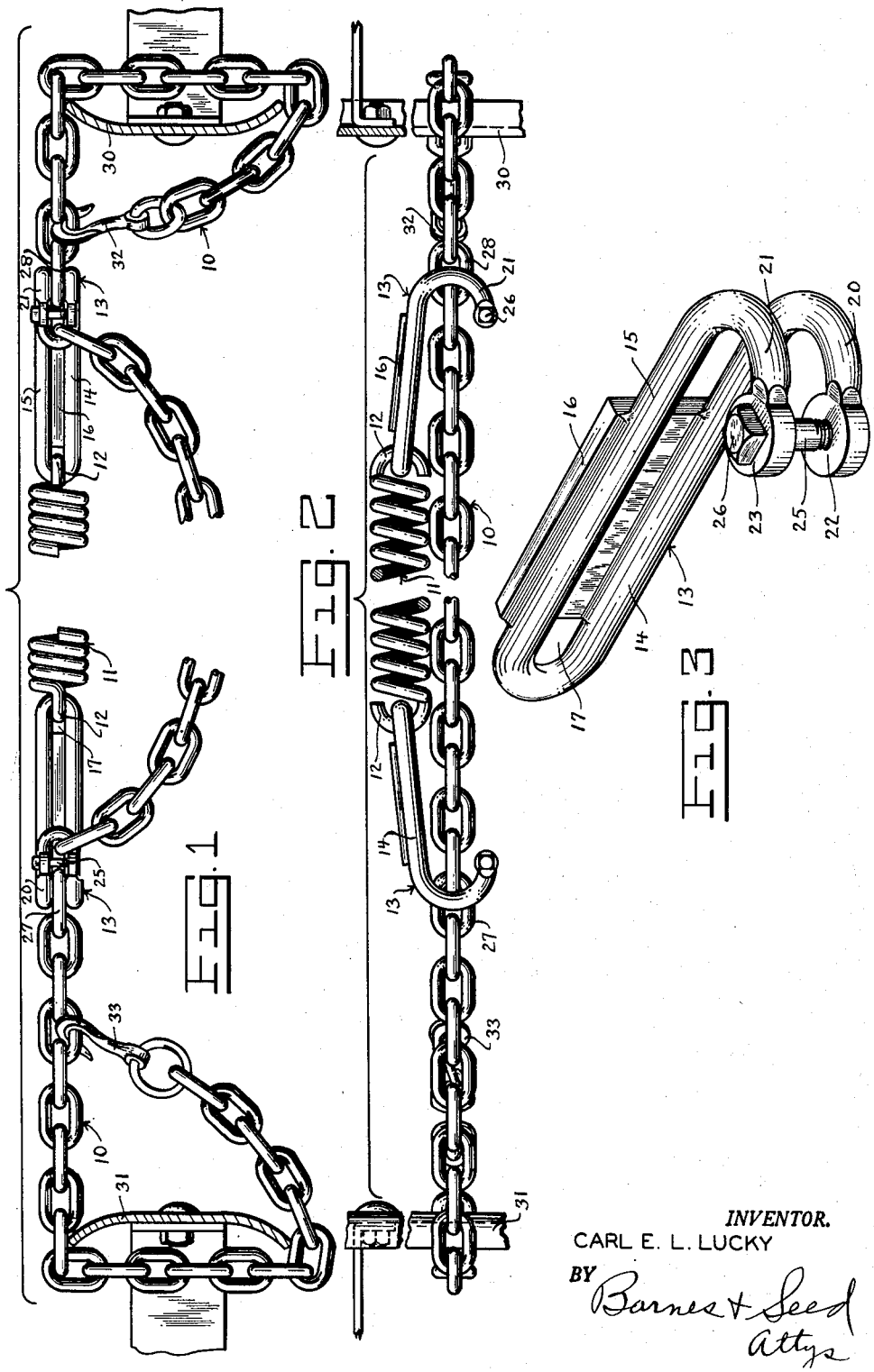
INVENTOR.
CARL E. L. LUCKY
BY Barnes & Seed
attys March 2, 1954  C. E. L. LUCKY  2,670,951
TOWING GEAR Filed Oct. 22, 1951  2 Sheets-Sheet 2

INVENTOR.
CARL E. L. LUCKY
BY Barnes & Seed
attys.

Patented Mar. 2, 1954

2,670,951

UNITED STATES PATENT OFFICE 2,670,951

TOWING GEAR

Carl E. L. Lucky, Stanwood, Wash.

Application October 22, 1951, Serial No. 252,475

3 Claims. (Cl. 267—74)

The present invention relates to towing gear and aims to eliminate shock loads on a towing line. In the event that a towing vehicle loses most of its traction, the invention further aims to provide a continuing pulling force derived from a storage of energy.

To elaborate, when one automobile is being used to pull another out of the mud, for example, it is often found impossible to gain sufficient traction if the tow line is initially taut. However, if the towing vehicle attempts to make a running start a severe load is suddenly thrown upon the tow line resulting usually in a severance of the line. By the use of the present invention this initial load is taken by a heavy tension spring and as the towing vehicle travels further along the load is transferred smoothly from the spring to a central length of tow line which had been inactive up to that time. Hence, this arrangement permits the force due to momentum of the towing vehicle to be utilized instead of tractive force alone. It also results in a continued pulling force by the tensioned spring if the towing car does lose traction.

Other objects and advantages more particularly concerned with details of construction will, with the foregoing, appear and be understood in the course of the following description and claims, the invention consisting in the novel construction and in the adaptation and combination of parts hereinafter described and claimed.

In the accompanying drawings:

Figure 1 is a fragmentary elevational view of my invention applied between two vehicle bumpers and with the spring relaxed.

Fig. 2 is a fragmentary top plan view of the invention with the spring shown in tension.

Fig. 3 is an enlarged perspective view of one of the chain-grabbing shackles.

Figure 4:
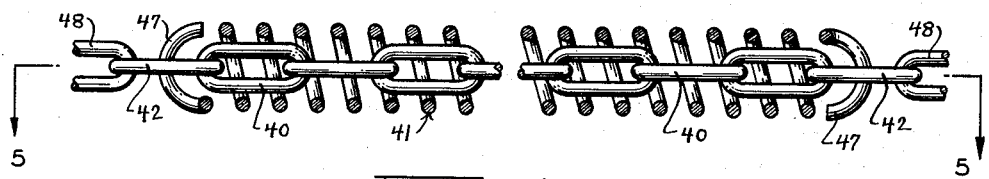
Fig. 4 is a fragmentary side elevational view of a modified form of my invention showing the spring tensioned and in section.

In the form of the invention illustrated in Figs. 1 and 2 a tow line 10 taking the form of a chain for purposes of example, is utilized in conjunction with a heavy tension spring 11 presenting terminal hooks 12 at its ends. For connecting the spring and tow chain a pair of chain-gripping shackles 13 are provided.

As can best be seen in Fig. 3 each of these shackles presents two spaced arms 14, 15 joined together at their root end from whence they progress in a substantially straight parallel relationship for a major portion of their length. These parallel portions are joined intermediate their ends by a reinforcing plate 16 welded thereto and terminating short of the root ends of the arms so that an eye 17 is provided. The free ends of the arms 14, 15 are doubled back to form laterally spaced hook portions 20, 21 and the ends of these hooks are formed with terminal eyes 22, 23. One of the eyes, designated by the numeral 22 in the present instance, is tapped to receive the threaded end of a shackle pin 25 used to bridge the eyes. The head 26 of the pin is preferably of a type receptive to the use of a tightening instrument, and in this regard the head can be square in cross-section permitting the ready application of a wrench.

The throat between the hooks 20, 21 is given a width slightly greater than the thickness of the links of the tow chain with which it is to be used so that the shackle can be readily caught over the flat of one of the chain links while the shackle pin is disassociated. The size of the eye 17 is made sufficient to receive a terminal hook 12 of the tension spring. It is relatively unimportant how long the shackle arms 14, 15 are made.

The tow chain, shackles, and tension spring thus far described are assembled together in the following manner. The maximum desirable stretched length of the spring 11 is determined and to this is added the combined lengths of the pair of shackles 13. The number of tow chain links approximating this total length of the stretched spring and shackles is then determined. The shackles, after having had their spring receiving eyes 17 passed over the spring hooks 12 to connect the spring and shackles together, and with their pins removed, are then passed over the flats of two of the chain links which are spaced apart by the number of links computed as above stated. These two links have been denoted by the numerals 27, 28 in the drawing and it is thought that it will appear obvious at this point that the portion of the tow chain between these links will be in a slackened condition when the spring is relaxed and will assume an aligned load-carrying state when the spring is tensioned sufficiently. After the tow chain, spring, and shackles have been thus assembled the shackle pins are replaced to keep the shackles in the assembled position.

For purposes of example, it will be assumed that an automobile having a rear bumper 30 is to be used as a tractive force to pull another car out of the mud, the latter's bumper being denoted by 31. The tow chain with the present invention incorporated therewith is connected between the bumpers as by passing a bight at each end thereof around a respective bumper and securing the ends with terminal hooks 32, 33 each passed through a link. It will be appreciated that the length of tow chain beyond each of the shackles is unimportant, such being shown as short in Fig. 1 for purposes of illustration only. The towing gear having been thus positioned, the towing car is set into motion with the portions of the tow chain between the shackles and the vehicle being slack so that a running start can be obtained. When this slack is taken up as the towing car moves forward the tension spring will begin to take a load and stretch accordingly until the slack in the length of chain between the shackles is eliminated. This length of chain will then take the load from the tensioned chain, but without a hard jerk which might overload the chain. At this time the towed vehicle will normally commence movement. If the towing vehicle then begins to skid and lose traction the spring force will take over and continue the pulling force, and since the towed vehicle has already started to move, this spring force is normally sufficient to overcome the remaining retarding frictional force and give the vehicle the needed additional impetus.

The towing gear has an equally important function when used to tow an automobile along a road. In such a case the forces on the tow line are normally not as great as in the aforedescribed situation, but nevertheless a snapping force often results when the towed vehicle suddenly momentarily coasts faster than the tow car is traveling so that slack is created in the tow line and then the tow car speeds up or the brakes of the towed auto are applied. In such a situation the snapping force is dampened by the spring and hence a smooth tow is obtained.

Figure 5:
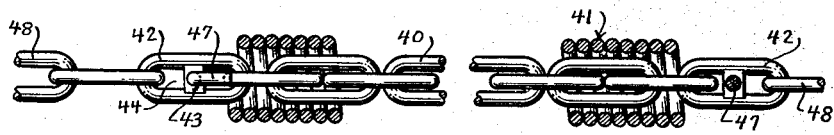
Fig. 5 is a sectional view taken along the line 5—5 of Fig. 4 and with the spring shown in a relaxed condition.
Figure 6:
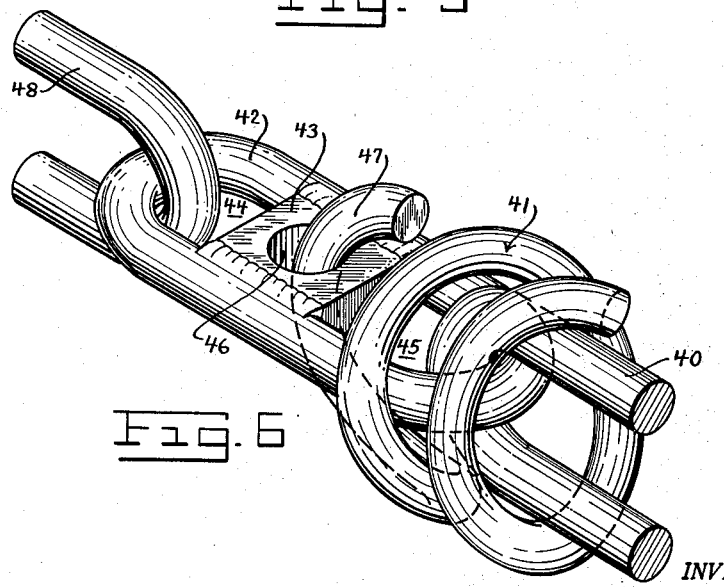
Fig. 6 is an enlarged fragmentary perspective view showing the connection at one end of the spring.

In the modified form of the invention illustrated in Figs. 4–6, a central length of chain having elongated links 40 is positioned within a tension spring 41 and has its ends linked with tri-holed links 42. Each of the latter is bisected by a transverse bridge 43 to provide end openings 44 and 45, and this bridge is centrally bored to provide a center opening 46. Into these center openings are inserted the terminal hooks 47 of the spring with the terminal elongated links 40 being received in the end openings 45. Conventional lengths of chain 48 are linked through the other end openings 46. These end lengths 48 may be provided with hooks or other locking means at their outer ends as was the tow chain 19.

The elongated links 40 are arranged to be telescoped within the tension spring, and in this regard the links are assembled with the adjacent ends of alternate links in contact with one another when the spring is in a relaxed state as shown in Fig. 4. This permits the spring to be tensioned and its length expanded for a considerable distance before any load is taken by the elongated links which slide relative to one another until they assume the position shown in Fig. 5. It is thought that it will now appear obvious that this modified form of my invention will act in exactly the same manner as that aforedescribed in that the tension spring can be expanded considerably before the load is transferred from one end section of the chain to the other independently of the spring.

The present invention has found great utility in the clearing of land. For example, tree stumps of considerable size can be extracted by means of a pull force derived from a conventional automobile.

It is thought that the invention will have been clearly understood from the foregoing description of my now-preferred embodiment. Changes in the details of construction will largely suggest themselves and may be resorted to without departing from the spirit of the invention, and it is, consequently, my intention that no limitations be implied and that the hereto annexed claims be read with the broadest interpretation to which the employed language fairly admits.

What I claim, is:

1. A towing gear comprising a pair of longitudinally spaced tri-eyed links each having three aligned holes, a telescoping load-carrying tow line section connected at its ends to the inner eyes of said links and having an expanded load-carrying length, a spring surrounding said telescoping section and connected at its ends to the center eyes of the links, said spring having a relaxed length less than the load-carrying length of the telescoping section, and end tow line sections connected to the outer eyes of said links.

2. A towing gear comprising the combination of a tow line having a central chain section composed of multiple elongated links whose openings substantially exceed twice the thickness of the links so as to permit said central section to telescope, and a tension spring placed in surrounding relation to said central section and having its ends connected with the ends of said section, said central section being arranged to telescope to a shortened length when the tension spring is relaxed.

3. The towing gear of claim 2 in which the links of said central chain section have an overall transverse span only slightly smaller than the inside diameter of the tension spring.

CARL E. L. LUCKY.

References Cited in the file of this patent

UNITED STATES PATENTS

| Number | Name | Date |
| --- | --- | --- |
| 1,325,422 | Stuart | Dec. 16, 1919 |
| 1,379,485 | Stuart | May 24, 1921 |
| 1,597,383 | Morton | Aug. 24, 1926 |
| 2,127,387 | Brattain | Aug. 16, 1938 |

FOREIGN PATENTS

| Number | Country | Date |
| --- | --- | --- |
| 939,735 | France | Apr. 26, 1948 |